United States Patent
Pu et al.

(10) Patent No.: US 11,166,023 B2
(45) Date of Patent: Nov. 2, 2021

(54) QUANTIZATION PARAMETER PREDICTION USING LUMINANCE INFORMATION

(71) Applicant: Dolby Laboratories Licensing Corporation, San Francisco, CA (US)

(72) Inventors: Fangjun Pu, Sunnyvale, CA (US); Taoran Lu, Santa Clara, CA (US); Peng Yin, Ithaca, NY (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 29 days.

(21) Appl. No.: 16/495,812

(22) PCT Filed: Mar. 21, 2018

(86) PCT No.: PCT/US2018/023634
§ 371 (c)(1),
(2) Date: Sep. 19, 2019

(87) PCT Pub. No.: WO2018/175638
PCT Pub. Date: Sep. 27, 2018

(65) Prior Publication Data
US 2020/0029078 A1 Jan. 23, 2020

Related U.S. Application Data

(60) Provisional application No. 62/474,372, filed on Mar. 21, 2017.

(51) Int. Cl.
*H04N 19/124* (2014.01)
*H04N 19/186* (2014.01)

(52) U.S. Cl.
CPC ......... *H04N 19/124* (2014.11); *H04N 19/186* (2014.11)

(58) Field of Classification Search
None
See application file for complete search history.

(56) References Cited

U.S. PATENT DOCUMENTS 10,136,133 B2    11/2018   Lu
10,419,762 B2    9/2019    Froehlich
(Continued)

FOREIGN PATENT DOCUMENTS

CN    103155553    6/2013
CN    103369321    10/2013
(Continued)

OTHER PUBLICATIONS

Anonymous: "Readme EE9 dqpScale of Software HM-16-6.6-JEM-3.1 EE9 dqpScale for JVET-C0095" Sep. 19, 2016 (Year: 2016).*
(Continued)

*Primary Examiner* — Dave Czekaj
*Assistant Examiner* — Shanika M Brumfield

(57) ABSTRACT

Methods for quantization parameter (QP) prediction are presented. In a coded bitstream that includes QP values, instead of simply embedding all delta QP values in the bitstream, the bitstream may include QP-related syntax elements that allow a decoder to reconstruct the delta QP values using luma-based QP prediction. Encoding and decoding bitstream examples are provided where delta QP values may be predicted using information from just the luminance values of the prediction blocks of the current block or by additional luminance information from its known neighbors (e.g., from the left or above blocks) and a base QP value.

10 Claims, 5 Drawing Sheets

(56) References Cited

U.S. PATENT DOCUMENTS

| | | | | |
|---|---|---|---|---|
| 2012/0114034 A1* | 5/2012 | Huang | ............... | H04N 19/70 |
| | | | | 375/240.03 |
| 2016/0134870 A1 | 5/2016 | Lu | | |
| 2018/0167615 A1* | 6/2018 | Kim | ............ | H04N 19/98 |

FOREIGN PATENT DOCUMENTS

| | | | | |
|---|---|---|---|---|
| CN | 103416060 | | 11/2013 | |
| WO | 2016084317 | | 6/2016 | |
| WO | 2016140954 | | 9/2016 | |
| WO | 2016199409 | | 12/2016 | |
| WO | WO-2016199409 A1 * | 12/2016 | ........... | H04N 19/184 |
| WO | 2018143289 | | 8/2018 | |

OTHER PUBLICATIONS

Carbon Copy the Web publication date for Anonymous: "Readme EE9 dqpScale of Software HM-16-6.6-JEM-3.1 EE9 dqpSCALE for JVET-C0095" Sep. 19, 2016 (Year: 2016).*

Anonymous: "Readme EE9 dqpScale of Software HM-16-6.6-JEM-3.1 EE9 dqpScale for JVET-C0095" Sep. 19, 2016.

Kondo, K. et al "Improvement of Delta-QP Coding" JCT-VC Meeting MPEG Meeting, Jul. 2011, JCT on Video Coding of ISO/IEC JTC1/SC29/WG11 and ITU-T SG.16.

Nakamura, H. et al "Non-CE4, Compatible QP Prediction with RC and AQ" JCTVC-H0204, Feb. 2012, pp. 1-14.

Pu, F. et al "Comments on Reshaping for HDR/WCG Compression" ISO/IEC JTC1/SC29/WG11 MPEG 2015/M37267, Oct. 2015, Geneva, Switzerland, pp. 1-6.

Rec. H.265 "High Efficiency Video Coding" ITU-T, Oct. 2014.

Samuelsson, J. et al Conversion and Coding Practices for HDR/WCG Y'CbCr 4:2:0 Video with PQ Transfer Characteristics (Draft 4), JCT-VC of ITU-T SG 16 WP 3 and ISO/IEC JTC 1/SC 29/WG 11, 26th Meeting: Geneva, CH, Jan. 12-20, 2017, pp. 1-30.

Segall, A. et al. "AHG on HDR and WCG: Average Luma Controlled Adaptive dQP" JCT-VC, of ITU-T SG 16 WP3 and ISO/IEC JTC 1/SC 29/WG11, 23rd Meeting: San Diego, USA, Feb. 19-26, 2016.

Zhao, J. et al "De-Quantization and Scaling for Next Generation Containers" Joint Video Exploration Team, JVET-80054 of ITU-T SG 16 WP 3 and ISO/IEC JTC 1/SC 29/WG 11, 2nd Meeting: San Diego, USA, Feb. 20-26, 2016, pp. 1-5.

Zhao, J. et al "EE2.4: De-Quantization and Scaling for Next Generation Containers" Joint Video Exploration Team, JVET-00095 of ITU-T SG 16 WP3 and ISO/IEC JTC 1/SC 29/WG11, 3rd meeting: Geneva, CH May 26-31, 2016, pp. 1-8.

Sansli, D. B. et al. "On Coefficient Scaling", Joint Video Exploration Team (JVET) of ITU-T SG 16 WP 3 and ISO/IEC JTC 1/SC 29/WG 11 3rd Meeting: Geneva, CH, May 26-Jun. 1, 2016, [JVET-C0066], 2016年 5月 日, JVET-C0066 (version 3), pp. 1-4.

* cited by examiner

QUANTIZATION PARAMETER PREDICTION USING LUMINANCE INFORMATION

CROSS-REFERENCE TO RELATED APPLICATIONS

The present application claims benefit of and claims priority to U.S. Provisional Application No. 62/474,372 filed on Mar. 21, 2017, the disclosure of which is incorporated herein by reference in its entirety.

TECHNOLOGY

The present invention relates generally to images. More particularly, an embodiment of the present invention relates to systems and methods for video coding and/or decoding and predicting the quantization parameters using luminance information.

BACKGROUND

Lossy compression schemes, such as JPEG, AVC (H.264), and HEVC (H.265), rely on quantization to reduce information that is deemed irrelevant to the human visual system. Thus, in an encoder, after image blocks (or residual blocks) are transformed into a frequency domain, the frequency-domain data is quantized using a quantization factor, commonly referred to as QP, and then further coded with a lossless coding scheme. The associated QP values for each block are encoded as part of the coded bitstream. In a receiver, the decoder uses the transmitted QP values to dequantize the frequency-domain data and the dequantized values are then used to reconstruct an approximation of the coded image or video sequence.

Existing image and video coding standards have served well the broadcasting community; however, new content, such as 360-degrees virtual-reality images or high-dynamic range images, stretch the capabilities of the existing tools. To improve existing image and video coding techniques, as appreciated by the inventors here, improved techniques for image quantization and prediction are developed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
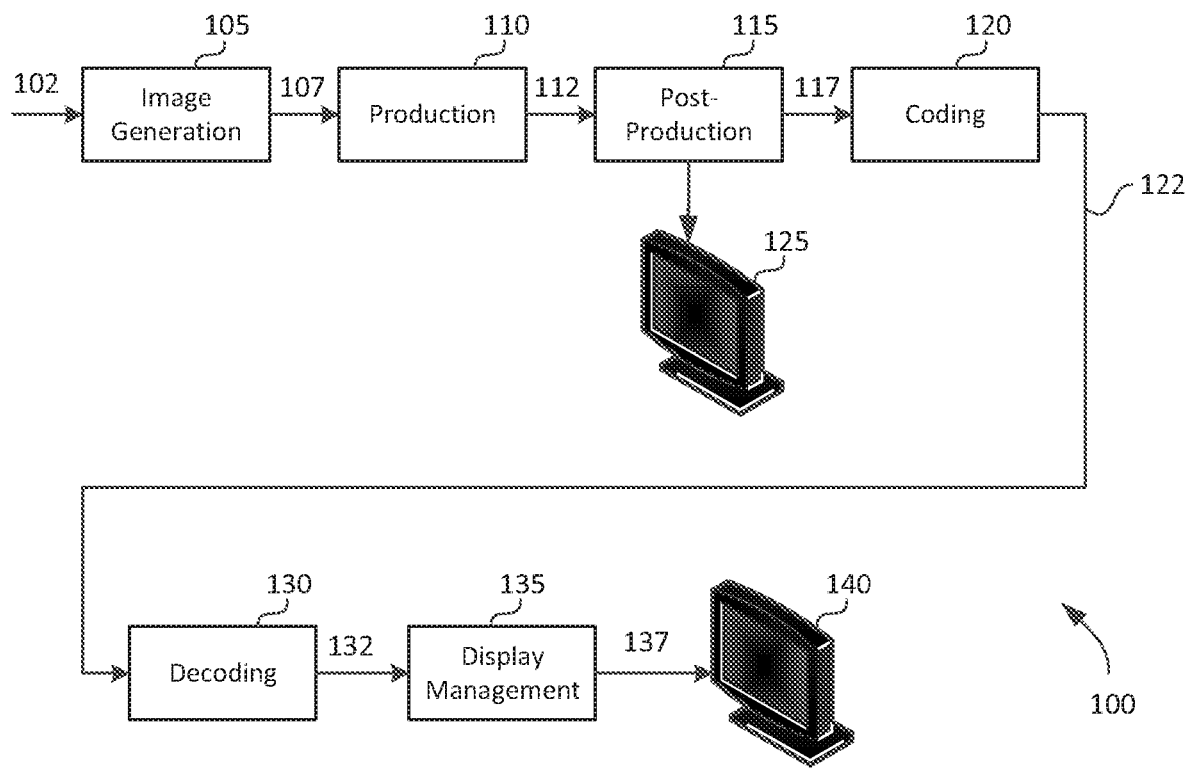
FIG. 1 depicts an example process for a video delivery pipeline.

Methods for quantization parameter (QP) prediction are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to methods for luma-based quantization parameter (QP) prediction. In an embodiment, in a video decoder, a processor receives a coded bitstream comprising syntax elements related to QP values encoded by an encoder. The decoder examines a first flag in the bitstream denoting whether luma-based QP prediction is enabled or not, and upon determining that luma-based QP prediction is enabled it examines a second flag in the bitstream denoting whether a custom QP mapping table is included or not in the bitstream, wherein the custom QP mapping table associates luminance values to delta QP values relative to base QP values. Upon detecting that a custom QP mapping table is included, it reads the custom QP mapping table using a set of table-related syntax elements in the bitstream. Based on the value of the second flag, the decoder selects a decoding delta QP mapping table as either a default QP mapping table or the custom QP mapping table and derives delta QP values to decode coded block in the bitstream.

In an embodiment, the decoder determines a method to reconstruct a delta QP value according to a third flag in the bitstream, wherein: for a first value of the third flag, the delta QP value is extracted from the bitstream. For a second value of the third flag, the delta QP value for a current block in the bitstream is generated based on the decoding delta QP mapping table and a function of luminance values in a prediction block used to decode the current block, and for a third value of the third flag, the delta QP value for the current block in the bitstream is generated based on the decoding delta QP mapping table, a function of luminance values in the prediction block used to decode the current block, and functions of luminance values in one or more neighbor blocks to the current block.

In a second embodiment, an apparatus comprises a bitstream stored on a non-transitory machine-readable media, wherein the bitstream is characterized by image data in a compressed format and syntax elements for determining quantization parameter (QP) values, wherein the syntax elements for determining QP values comprise: a first flag denoting whether luma-based prediction of QP values is enabled or not, a second flag denoting whether a custom QP mapping table is included in the bitstream or not, and a set of table-related elements allowing a decoder to read the custom QP mapping table when the second flag denotes that the custom QP mapping table is included in the bitstream.

In an embodiment, the syntax elements may include a third flag denoting two or more types of QP prediction based on the custom QP mapping table or a default QP mapping table and luminance values of coded block values in the bitstream, wherein the custom QP mapping table associates luminance values to delta QP values.

Video Coding

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Quantization

In a traditional image pipeline (e.g., 100), captured images (102) are quantized using a non-linear opto-electronic function (OETF), which converts linear scene light into a non-linear video signal (e.g., gamma-coded RGB or YCbCr). Then, on the receiver, before being displayed on the display (140), the signal is processed by an electro-optical transfer function (EOTF) which translates video signal values to output screen color values. Such non-linear functions include the traditional "gamma" curve, documented in ITU-R Rec. BT.709 and BT.2020, and the "PQ" (perceptual quantization) curve, described in SMPTE ST 2084 and Rec. ITU-R BT.2100.

Compared to the gamma curve, the PQ curve, typically applied to images of high-dynamic range (HDR), assigns more codewords in the dark areas and fewer codewords in the highlights. In compressing HDR images, it is suggested to allocate more bits to the bright areas or the highlights. Since traditional coding schemes, such as AVC and HEVC are optimized for gamma-coded YCbCr sequences, one approach to accommodate PQ-coded signals within a 10-bit encoder (120) is to apply a "reshaping" function to the input signal (e.g., 117) before encoding [1][2]. Reshaping shifts some of the codewords to the highlights, thus improving coding efficiency. On the receiver, a decoder needs to apply an inverse-reshaping function to the decoded signal (e.g., 132) to recover the original input. Reshaping functions may need to be adjusted at the frame or scene level, thus increasing overhead in the bitstream and reducing compression efficiency.

In a traditional codec, such as AVC or HEVC, after a quantization parameter (QP) is defined at the picture or slice level, subsequently, it may be adjusted using a sequence of delta QP values (e.g., HEVC defines the parameters cu_qp_delta_abs and cu_qp_delta_sign_flag, which combined define the delta QP value, qp_delta) which can be used to increase or decrease the QP value at the coding-block level. Delta QP values are relatively small values, thus the coding overhead is typically rather small; nevertheless, as picture resolutions keep increasing, and delta QP values may be provided even at the sub-macroblock, coding unit, or transform unit level, it may be beneficial to reduce that overhead even further.

Predicting QP Values Based on Luma Values

According to embodiments of this invention, one approach to reduce overhead due to delta QP values comprises for the decoder to predict the delta QP value using the same technique as being used by the encoder to derive the same delta QP value. In such a scenario, there is no need for the encoder to transmit any delta QP values, thus reducing overhead.

In an embodiment, QP may be characterized as a function of two variables: $QP_{LUM}$, denoting block luminance-related information (e.g., peak luminance or average luminance), and $\Delta QP_{OTHER}$, denoting other block features, such as block activity (e.g., variance or standard deviation), edge information, motion, etc., which are being used in rate control and adaptive quantization [3]. Thus, $$QP = QP_{LUM} + \Delta QP_{OTHER}. \quad (1)$$

Let $QP_{PRED}$ denote a QP prediction value, used to derive the delta QP value (e.g., $qp\_delta = QP - QP_{PRED}$, where qp_delta denotes what is actually encoded in the bitstream). From equation (1), in an embodiment, $QP_{PRED}$ may also be expressed as $$QP_{PRED} = QP_{PRED-LUM} + \Delta QP_{PRED-OTHER}. \quad (2)$$

Two cases are considered: a) QP prediction based only on luma information (that is, $\Delta QP_{PRED-OTHER} = 0$) and b) QP prediction based both on luma and "other" information. The two cases are examined next.

Let $f(L)$ denote a function of luminance for a block used to predict the current block. The prediction block can be of any suitable type and/or size, such as: a coding tree unit (CTU), a coding unit (CU), a transform unit (TU), a 4×4 block, or a coded block that includes multiple 4×4 blocks, and the like. For example, in an embodiment $f(L)$ may represent the average luminance. In other embodiments, it may represent a peak luminance, median luminance, or some other function of the luminance. It is expected that $f(L)$ will be known to both the encoder and the decoder. In an embodiment, $QP_{PRED-LUM}$ (or more conveniently, the delta QP) may be expressed as a function of $f(L)$ $$QP_{PRED} = QP_{PRED-LUM} = baseQP + deltaQP,$$

$$deltaQP = dQP\_LUT(f(L)), \quad (3)$$

where dQP_LUT( ) denotes a function (or a look-up-table (LUT)) mapping the function of the block-luminance values into delta QP values, and baseQP denotes a QP value known by both the encoder and the decoder (e.g., the QP value at the slice level).

Some coding standards may predict a block from two (or more blocks) (e.g., bi-predictive coding in AVC and HEVC). In such a case, $f(L)$ may represent a function of the luminance in all pixels used to predict the current block.

The mapping from $f(L)$ values to deltaQP values may be predetermined and fixed, or it may be defined as part of the bitstream syntax. For example, without limitation, Table 1 ([4]) provides, an example of such mapping for 10-bit data, where $f(L)=L_{AV}$ represents the average luminance in one or more blocks used to predict the current block.

TABLE 1

Example of Delta QP versus average luminance mapping

| $L_{AV}$ = f(L) range | deltaQP |
|---|---|
| $L_{av}$ < 301 | 3 |
| 301 ≤ $L_{av}$ < 367 | 2 |
| 367 ≤ $L_{av}$ < 434 | 1 |
| 434 ≤ $L_{av}$ < 501 | 0 |
| 501 ≤ $L_{av}$ < 567 | −1 |
| 567 ≤ $L_{av}$ < 634 | −2 |
| 634 ≤ $L_{av}$ < 701 | −3 |
| 701 ≤ $L_{av}$ < 767 | −4 |
| 767 ≤ $L_{av}$ < 834 | −5 |
| $L_{av}$ ≥ 834 | −6 |

Figure 2:
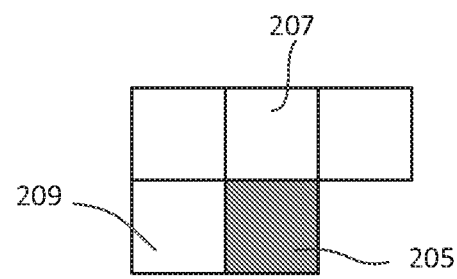
FIG. 2 depicts an example of neighbor coded blocks.

When the encoder makes QP adjustments based on other features as well, then in an embodiment, $\Delta QP_{PRED-OTHER}$ for the current block (e.g., 205) could be derived based on information of neighboring blocks, especially blocks that would be considered known to a decoder, e.g., as depicted in FIG. 2, its left block (209), or its above or top block (207). For example, $\Delta QP_{PRED-OTHER}=(\Delta QP_{ABOVE-OTHER}+\Delta QP_{LEFT-OTHER})/2$, $\Delta QP_{ABOVE-OTHER}=QP_{ABOVE}-QP_{ABOVE-LUM}$, $\Delta QP_{LEFT-OTHER}=QP_{LEFT}-QP_{LEFT-LUM}$, (4)

and $QP_{ABOVE-LUM}=baseQP+dQP\_LUT(f(L_{ABOVE}))$, $QP_{LEFT-LUM}=baseQP+dQP\_LUT(f(L_{LEFT}))$, (5)

where $f(L_{ABOVE})$ and $f(L_{LEFT})$ are functions of the luminance values in the blocks above (207) and left (209) to the current block (205), and the dQP_LUT( ) function determines a delta QP value based on a function of the luma, e.g., as depicted by Table 1. Thus, $deltaQP=dQP\_LUT(f(L))+\Delta QP_{PRED-OTHER}$. (6)

$QP_{PRED}=baseQP+dQP\_LUT(f(L))+\Delta QP_{PRED-OTHER}$ (7)

In a preferred embodiment, an encoder has the flexibility to either: signal the delta QP explicitly (default), signal a delta QP based on the luminance of the prediction block, or signal a delta QP based on both the luminance of the prediction block and QP values of the neighbor blocks. As an example, Tables 2 and 3 provide examples of bitstream syntax by modifying the existing "General sequence parameter set RBSP syntax" and "General picture parameter set RBSP syntax" in Sections 7.3.2.2.1 and 7.3.2.3.1 of the HEVC specification [5]. New bitstream syntax elements, over the existing HEVC syntax, are shown in bold.

TABLE 2

Example bitstream syntax at the sequence parameter set level

| | Descriptor |
|---|---|
| seq_parameter_set_rbsp( ) { | |
|   sps_video_parameter_set_id | u(4) |
|   .... | |
|   luma_qp_prediction_enabled_flag | u(1) |
|   if ( luma_qp_prediction_enabled_flag ) { | |
|     luma_dQP_map_LUT_idc | ue(v) |
|     if ( luma_dQP_map_LUT_idc = = 2 ) { | |
|       num_entries_minus1 | ue(v) |
|       for( i = 0; i < num_entries_minus1 + 1 ; i++ ) { | |
|         luma_value [ i ] | u(v) |
|         dQP_value [ i ] | se(v) |
|       } | |
|     } | |
|   } | |
|   ...... | |
| } | |

TABLE 3

Example bitstream syntax at the picture parameter set level

| | Descriptor |
|---|---|
| pps_parameter_set_rbsp( ) { | |
|   pps_pic_parameter_set_id | u(4) |
|   .... | |
|   cu_qp_delta_enabled_flag | u(1) |
|   if( cu_qp_delta_enabled_flag ) { | |
|     diff_cu_qp_delta_depth | ue(v) |
|     if ( luma_qp_prediction_enabled_flag ) | |
|       luma_qp_prediction_idc | ue(v) |
|   } | |
|   ...... | |
| } | | luma_qp_prediction_enabled_flag equal to 1 specifies that the luma_QP_map_LUT_idc, mum_pivot_minus1, luma_pivot_value[i], and dQP_value[i] syntax element are present in the SPS and that luma_qp_prediction_idc is present in the PPS. luma_qp_prediction_enabled_flag equal to 0 specifies that the luma_QP_map_LUT_idc, mum_pivot_minus1, luma_pivot_value[i], and dQP_value[i] syntax element are not present in the SPS and that luma_qp_prediction_idc is not present in the PPS. When not present, the value of luma_qp_prediction_enabled_flag is inferred to be equal to 0.

luma_dQP_map_LUT_idc specifies the luma dQP map lookup table. The value of luma_dQP_map_LUT_id shall be in the range of 0 to 2, inclusive. luma_dQP_map_LUT_idc equal to 0 indicates the default luma dQP LUT for HDR video. luma_dQP_map_LUT_idc equal to 1 indicates the default luma dQP LUT for SDR video in PQ container. luma_dQP_map_LUT_idc equal to 2 indicates the luma dQP LUT is specified as following. When not present, the value of luma_dQP_map_LUT_idc is inferred to be equal to 0.

num_entries_minus1 plus 1 specifies number of entries in the luma dQP map lookup table (e.g., dQP_LUT( )).

luma_value[i] specifies the luma value for the i-th entry in the luma dQP map lookup table.

dQP_value[i] specifies the dQP value for the i-th entry in the luma dQP map lookup table.

As shown in Table 1, typically, a delta QP value would be applied to a broad range of luminance values. To reduce the number of entries in the delta QP mapping table, in one embodiment, if luma_value [i+1]>luma_value≥luma_value [i], then dQP_value=dQP_value [i]. In another embodiment, a delta QP mapping table may be expressed with explicit boundary values, thus, for example, the code in Table 2 for reading the delta QP mapping values may be replaced by

```
for(i=0; i < num_entries_minus1+ 1; i++) {
    luma_min_value[i]
    luma_max_value[i]
    dQP_value[i]
}
and if luma_max_value [i] > luma_value ≥ luma_min_value [i] ;
dQP_value = dQP_value [i].
``` luma_qp_prediction_idc indicates what QP prediction method is used. The value of luma_qp_prediction_idc shall be in the range of 0 to 2, inclusive. luma_qp_prediction_idc equal to 0 indicates the QP prediction in HEVC is used. luma_qp_prediction_idc equal to 1 indicates QP prediction only uses luma related information. luma_qp_prediction_idc equal to 2 indicates that QP prediction uses both luma related information and spatial neighboring information.

Some embodiments may not use the luma_qp_prediction_idc flag. A decoder may simply use the luma_qp_prediction_enabled_flag or a value of the luma_dQP_map_LUT_idc flag to apply QP prediction in a predetermined way.

Figure 3A:
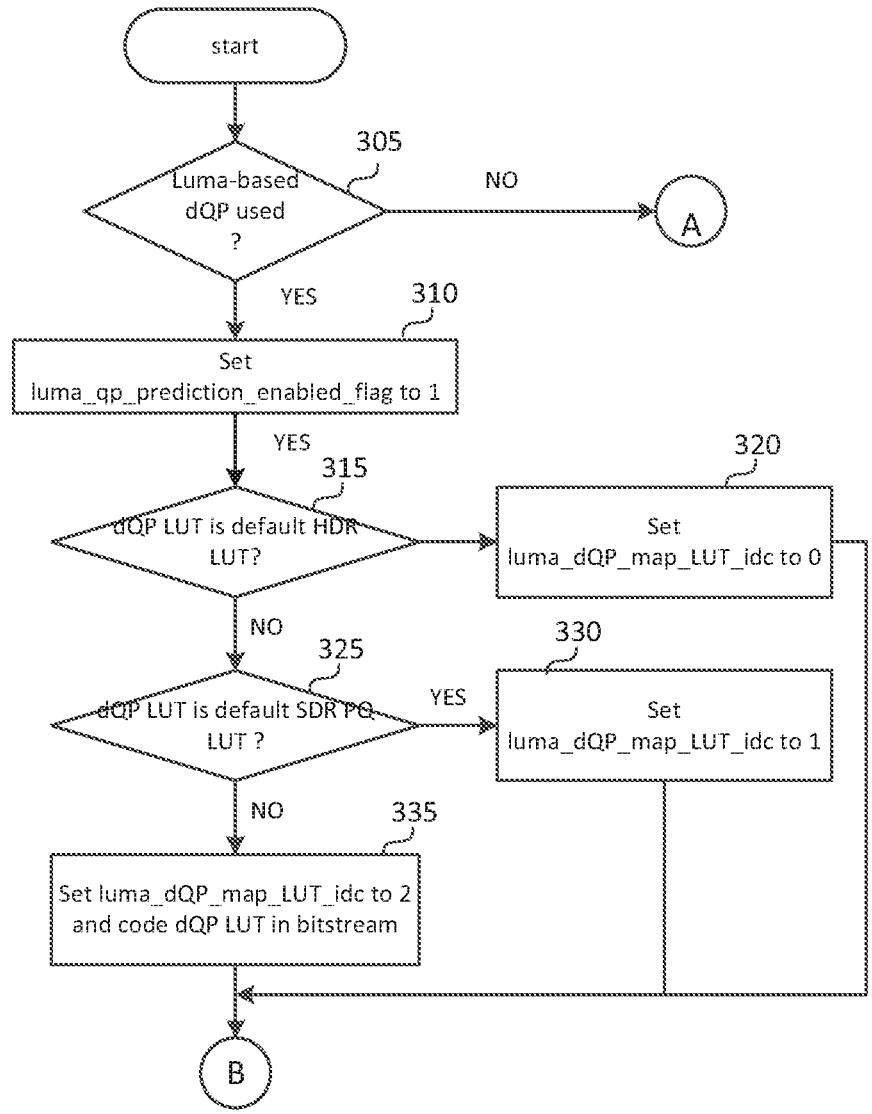
FIG. 3A and FIG. 3B depict an example encoding process for determining bitstream parameters for luma-based delta QP coding according to an embodiment of the present invention.
Figure 3B:
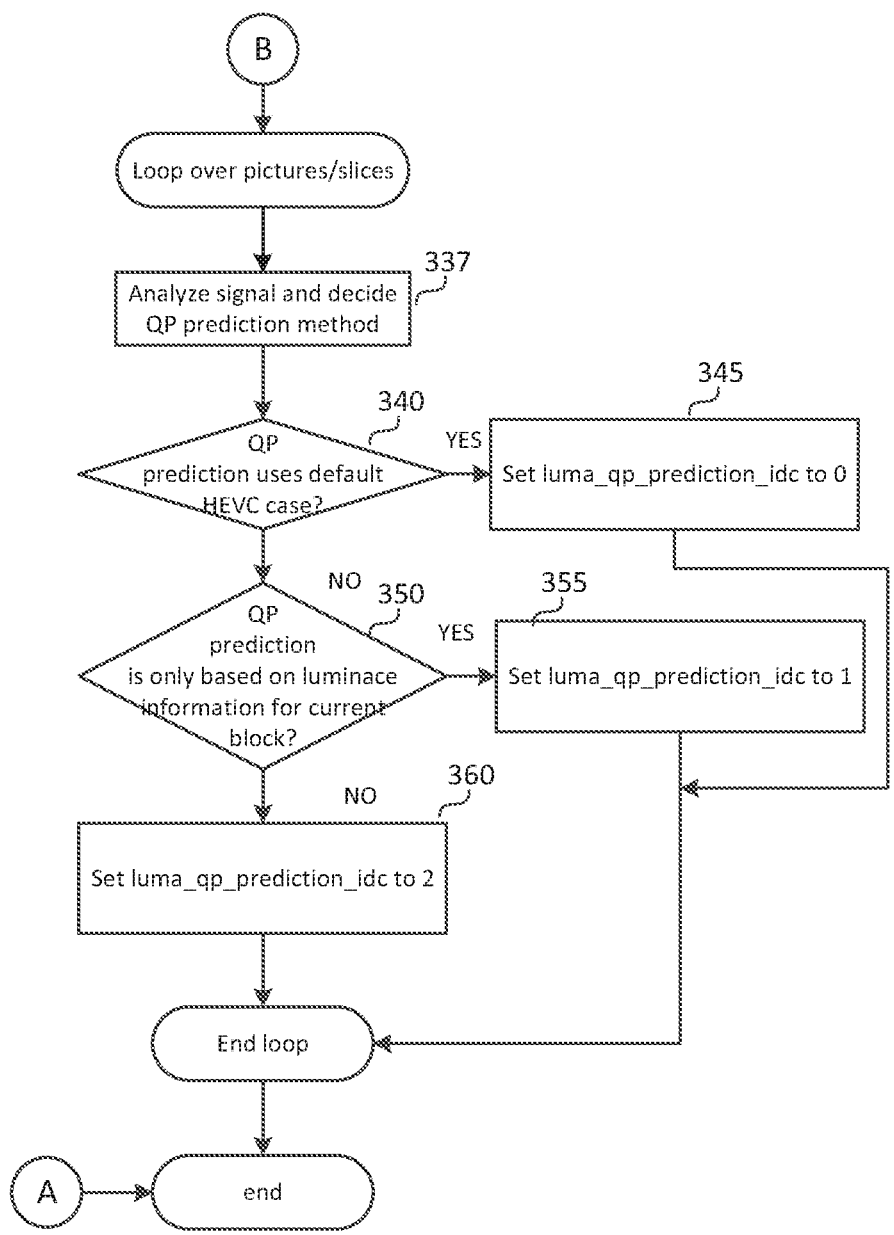

FIG. 3A and FIG. 3B depict an example encoding process for constructing a bitstream according to an embodiment. As depicted in FIG. 3A, in step 305, the encoder determines whether the proposed luma-based QP prediction method (luma dQP) for communicating delta QP values will be used in the bitstream. If yes, then luma_qp_prediction_enabled_flag is set to 1 (310). Next (steps 315 and 325), the encoder determines whether it is going to use any of the default delta QP look-up tables or not. Without limitation, example options are provided for a default table for HDR data (step 320) or a default table for SDR data using the PQ EOTF (step 330). Alternatively, (in step 335), the encoder may encode in the bitstream a custom delta QP LUT. Given these delta QP LUT definitions, then, as depicted in FIG. 3B, for every picture and/or slice, the encoder determines QP values and decides how to communicate delta QPs (337): a) using the default method (steps 340 and 345) b) using prediction based only on luma information (steps 350 and 355) (see equation (3)), or c) using prediction based on both luma information and "other" (e.g., neighborhood) information (see equations (4)-(6)) (step 360).

In some embodiments, there might not be an option to select default dQP LUTs. In other embodiments, the syntax may support using more than two dQP LUTs.

Figure 4A:
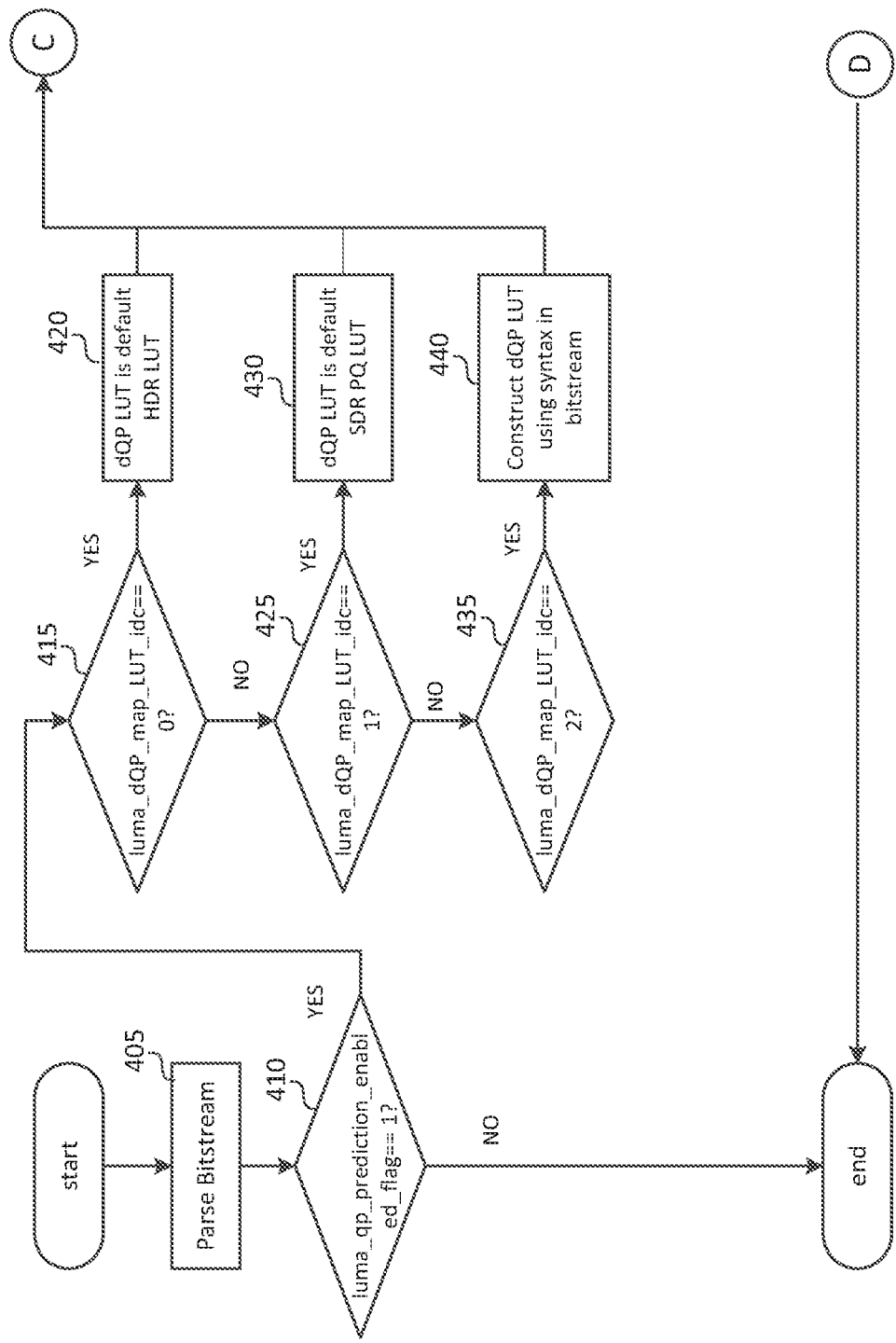
FIG. 4A and FIG. 4B depict an example process for decoding bitstream parameters in a decoder for luma-based delta QP prediction according to an embodiment of the present invention.
Figure 4B:
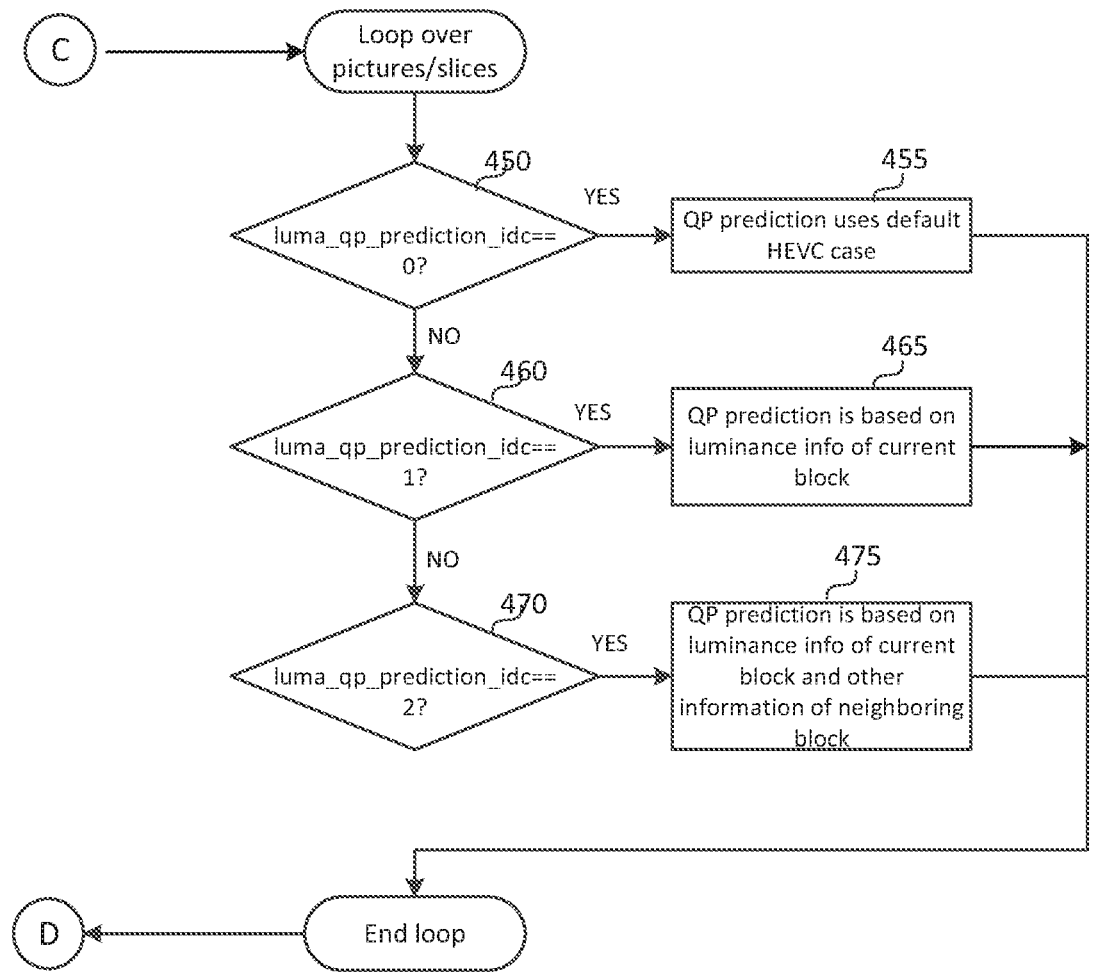

FIG. 4A and FIG. 4B depict an example process for decoding a bitstream and applying luma-based delta QP prediction according to an embodiment. As depicted in FIG. 4A, after parsing the bitstream (405), in step 410, the decoder detects whether luma-based QP prediction is enabled or not. If luma-based QP prediction is detected, the decoder needs to determine whether the bitstream can be decoded using default delta QP tables (steps 415, 420, 425, and 430) or new tables embedded in the bitstream (steps 435 and 440). Depending on the encoder options, different default tables may be defined, for example, for HDR-coded data and for SDR-coded data.

Following the construction of any delta QP LUTs, the process continues into the actual determination of the delta QP values (C). As depicted in FIG. 4B, this part may be repeated over all pictures and over all slices. Looking at the value of luma_qp_prediction_idc (e.g., 0, 1, or 2) (see steps 450, 460, and 470), the decoder can determine whether delta QPs are communicated: a) using the default method (steps 450 and 455) b) using prediction based only on luma information (steps 460 and 465) (see equation (3)), or c) using prediction based on both luma information and "other" (e.g., neighborhood) information (see equations (4)-(6)) (steps 470 and 475). Given the delta QP values, a decoder may generate the QP value to decoded a block as:

$$QP=baseQP+deltaQP. \tag{8}$$

REFERENCES

The following references are included by reference in their entirety.

[1] WO 2016/140954, "Content-Adaptive Perceptual Quantizer for High Dynamic Range Images," by J. Froehlich et al.

[2] "Comments on Reshaping for HDR/WCG compression", MPEG input document, M37267, October 2015, Geneva, CH.

[3] US 2016/0134870 Patent Application Publication, "Rate Control Adaptation for High-Dynamic Range Images," by T. Lu et al.

[4] Technical Report ISO/IEC 23008-14 (2017), "Conversion and Coding Practices for HDR/WCG Y'CbCr 4:2:0 Video with PQ Transfer Characteristics."

[5] Rec. H.265, "High efficiency video coding," ITU-T, 10/2014.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to quantization parameter prediction, such as those described herein. The computer and/or IC may compute any of a variety of parameters or values that relate to quantization parameter prediction processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to quantization parameter prediction as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to quantization parameter prediction are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. In an image and/or video decoder, a method for luma-based quantization parameter (QP) prediction using a processor, the method comprising:
    receiving a coded bitstream comprising syntax elements related to QP values encoded by an encoder;
    examining a first flag in the bitstream denoting whether luma-based QP prediction is enabled or not, and upon determining that luma-based QP prediction is enabled:
        examining a second flag in the bitstream denoting whether a custom QP mapping look-up-table is included or not in the bitstream, wherein a QP mapping look-up-table maps a function of block-luminance values into delta QP value, and upon detecting that a custom QP mapping look-up-table is included, reading the custom QP mapping look-up-table using a set of QP mapping look-up-table syntax elements including a set of QP mapping look-up-table syntax parameters in the bitstream;
    based on the value of the second flag, selecting a decoding delta QP mapping look-up-table as either a default QP mapping look-up-table or the custom QP mapping look-up-table;
    generating a delta QP value based on the decoding delta QP mapping look-up-table, wherein generating the delta QP value further comprises:
        determining a method to reconstruct the delta QP value according to a value of a third flag in the bitstream denoting one or more types of QP prediction based on the custom QP mapping look-up-table or the default QP mapping look-up-table and luminance values in coded blocks in the bitstream, wherein the one or more types of QP prediction comprise:
            for a first value of the third flag, a default type, wherein the delta QP value is extracted from the bitstream;
            for a second value of the third flag, a first prediction type, wherein the delta QP value for a current block in the bitstream is generated based on the decoding delta QP mapping look-up-table and a function of luminance values in a prediction block used to decode the current block; and
            for a third value of the third flag, a second prediction type, wherein the delta QP value (deltaQP) for the current block in the bitstream is generated as:

$$\text{deltaQP} = d\text{QP\_LUT}(f(L)) + \Delta \text{QP}_{PRED\text{-}OTHER},$$

where $$\Delta \text{QP}_{PRED\text{-}OTHER} = (\Delta \text{QP}_{ABOVE\text{-}OTHER} + \Delta \text{QP}_{LEFT\text{-}OTHER})/2,$$

$$\Delta \text{QP}_{ABOVE\text{-}OTHER} = \text{QP}_{ABOVE} - \text{QP}_{ABOVE\text{-}LUM},$$

$$\Delta \text{QP}_{LEFT\text{-}OTHER} = \text{QP}_{LEFT} - \text{QP}_{LEFT\text{-}LUM},$$

and $$\text{QP}_{ABOVE\text{-}LUM} = \text{baseQP} + d\text{QP\_LUT}(f(L_{ABOVE})),$$

$$\text{QP}_{LEFT\text{-}LUM} = \text{baseQP} + d\text{QP\_LUT}(f(L_{LEFT})),$$

where $\text{QP}_{ABOVE}$ denotes a QP value for a block above the current block, $\text{QP}_{LEFT}$ denotes a QP value for a block left to the current block, $d\text{QP\_LUT}(\ )$ denotes the decoding delta QP mapping look-up-table, and $f(L)$, $f(L_{ABOVE})$, and $f(L_{LEFT})$ denote functions of luminance values in the prediction block, the block above to the current block, and the block left to the current block;
    based on the reconstructed delta QP value, generating a QP value to decode a coded block in the bitstream by adding the delta QP value to a base QP value, wherein the base QP value denotes a value known by both, encoder and decoder.

2. The method of claim 1, wherein the set of QP mapping look-up-table syntax parameters in the bitstream include: a variable denoting the number of table entries, and for each table entry a luminance value and its corresponding delta QP value.

3. The method of claim 1, wherein the function of luminance values in the prediction block comprises the average of luminance values in pixels in the prediction block.

4. The method of claim 1, wherein for the second value of the third flag, the delta QP value (deltaQP) is generated as:

$$\text{deltaQP} = d\text{QP\_LUT}(f(L)),$$

where $d\text{QP\_LUT}(\ )$ denotes the decoding mapping QP look-up-table, and $f(L)$ denotes the function of luminance values in the prediction block used to decode the current block.

5. The method of claim 1, wherein $f(\ )$ denotes the average of the luminance of pixel values in a block under consideration.

6. An apparatus comprising a processor and configured to perform the method recited in claim 1.

7. A non-transitory computer-readable storage medium having stored thereon computer-executable instructions for executing a method with one or more processors in accordance with claim 1.

8. In an image and/or video encoder, a method for generating a coded bitstream using a processor, the bitstream supporting luma-based quantization parameter (QP) prediction, the method comprising:

setting a first flag to a value denoting that luma-based QP prediction is enabled in the bitstream;

setting a second flag to a value denoting whether luma-based QP prediction utilizes default QP mapping look-up-tables or a custom QP mapping look-up-table, wherein a QP mapping-look-up table maps a function of block-luminance values into delta QP values; and setting values to a set of QP mapping look-up-table syntax parameters included in a set of QP mapping look-up-table syntax elements so that a decoder can read the custom QP mapping look-up-table when the custom QP mapping look-up-table is included in the bitstream, setting a third flag to a value denoting one or more types of QP prediction based on the custom QP mapping look-up-table or a default QP mapping look-up-table and luminance values in coded blocks in the bitstream for reconstructing a delta QP value to generate a QP value by adding the reconstructed delta QP value to a base QP value, wherein the base QP value denotes a value known by both, encoder and decoder, and wherein the one or more types of QP prediction comprise:

a default type, wherein the delta QP value is embedded in the bitstream;

a first prediction type, wherein the delta QP value for a current block in the bitstream is generated based on a decoding delta QP mapping look-up-table and a function of luminance values in a prediction block used to decode the current block; and a second prediction type wherein the delta QP value (deltaQP) for the current block in the bitstream is generated as:

$$deltaQP = d\text{QP\_LUT}(f(L)) + \Delta QP_{PRED\text{-}OTHER},$$

where $$\Delta QP_{PRED\text{-}OTHER} = (\Delta QP_{ABOVE\text{-}OTHER} + \Delta QP_{LEFT\text{-}OTHER})/2,$$

$$\Delta QP_{ABOVE\text{-}OTHER} = QP_{ABOVE} - QP_{ABOVE\text{-}LUM},$$

$$\Delta QP_{LEFT\text{-}OTHER} = QP_{LEFT} - QP_{LEFT\text{-}LUM},$$

and $$QP_{ABOVE\text{-}LUM} = \text{baseQP} + d\text{QP\_LUT}(f(L_{ABOVE})),$$

$$QP_{LEFT\text{-}LUM} = \text{baseQP} + d\text{QP\_LUT}(f(L_{LEFT})),$$

where $QP_{ABOVE}$ denotes a QP value for a block above the current block, $QP_{LEFT}$ denotes a QP value for a block left to the current block, $d\text{QP\_LUT}(\ )$ denotes the decoding delta QP mapping look-up-table, and $f(L)$, $f(L_{ABOVE})$, and $f(L_{LEFT})$ denote functions of luminance values in the prediction block, the block above to the current block, and the block left to the current block.

9. The method of claim 8, wherein the set of QP mapping look-up-table syntax parameters in the bitstream include: a variable denoting the number of table entries, and for each table entry a luminance value and its corresponding delta QP value.

10. The method of claim 8, wherein the decoding delta QP mapping look-up-table is determined based on the value of the second flag and comprises a default delta QP mapping look-up-table or the custom QP mapping look-up-table.

* * * * *